United States Patent [19]

Baker

[11] 4,289,931
[45] Sep. 15, 1981

[54] SECURITY IDENTIFICATION SYSTEM USING PULSE CODE MODULATION

[75] Inventor: Donald G. Baker, Wildwood, Ill.

[73] Assignee: Micro-Tek, Inc., Atlanta, Ga.

[21] Appl. No.: 95,004

[22] Filed: Nov. 28, 1979

[51] Int. Cl.$^3$ .............................................. H04M 1/57
[52] U.S. Cl. ................................. 179/5.5; 179/18 FH
[58] Field of Search ................ 179/2 DP, 5.5, 18 FH, 179/2 CA; 340/147 R; 370/110

[56] References Cited

U.S. PATENT DOCUMENTS 3,436,487  4/1969  Blanc .............................. 179/2 DP
3,904,830  9/1975  Every, Sr. et al. ............... 179/18 FH Primary Examiner—Joseph A. Popek
Attorney, Agent, or Firm—Kinzer, Plyer, Dorn & McEachran

[57] ABSTRACT

A security identification system for telephone, teleprinter, computer, and similar communication applications comprising a plurality of transmitter station identification units, one for each transmitter station and each including an identification signal generator for generating a pulse code modulated identification signal, unique to the transmitter station, that comprises a repeating sequence of uncoded signal segments each including N pulse intervals of given duration alternating with coded signal segments each including M pulse intervals of like duration, coding being effected by the presence or absence of pulses in the coded signal segment intervals. Each pulse is transmitted as a burst of cycles of a carrier signal preferably having a carrier frequency above 3 Khz. The system further comprises a receiver identification unit at a receiver station, including a demodulator, an identification control circuit, and a visual display; the control circuit counts the pulse intervals in a demodulated uncoded segment of the identification signal to aid in identifying the beginning of each coded segment and decodes the coded segments, on a redundant basis, to actuate the display and afford a visual identification of the transmitter station.

10 Claims, 5 Drawing Figures

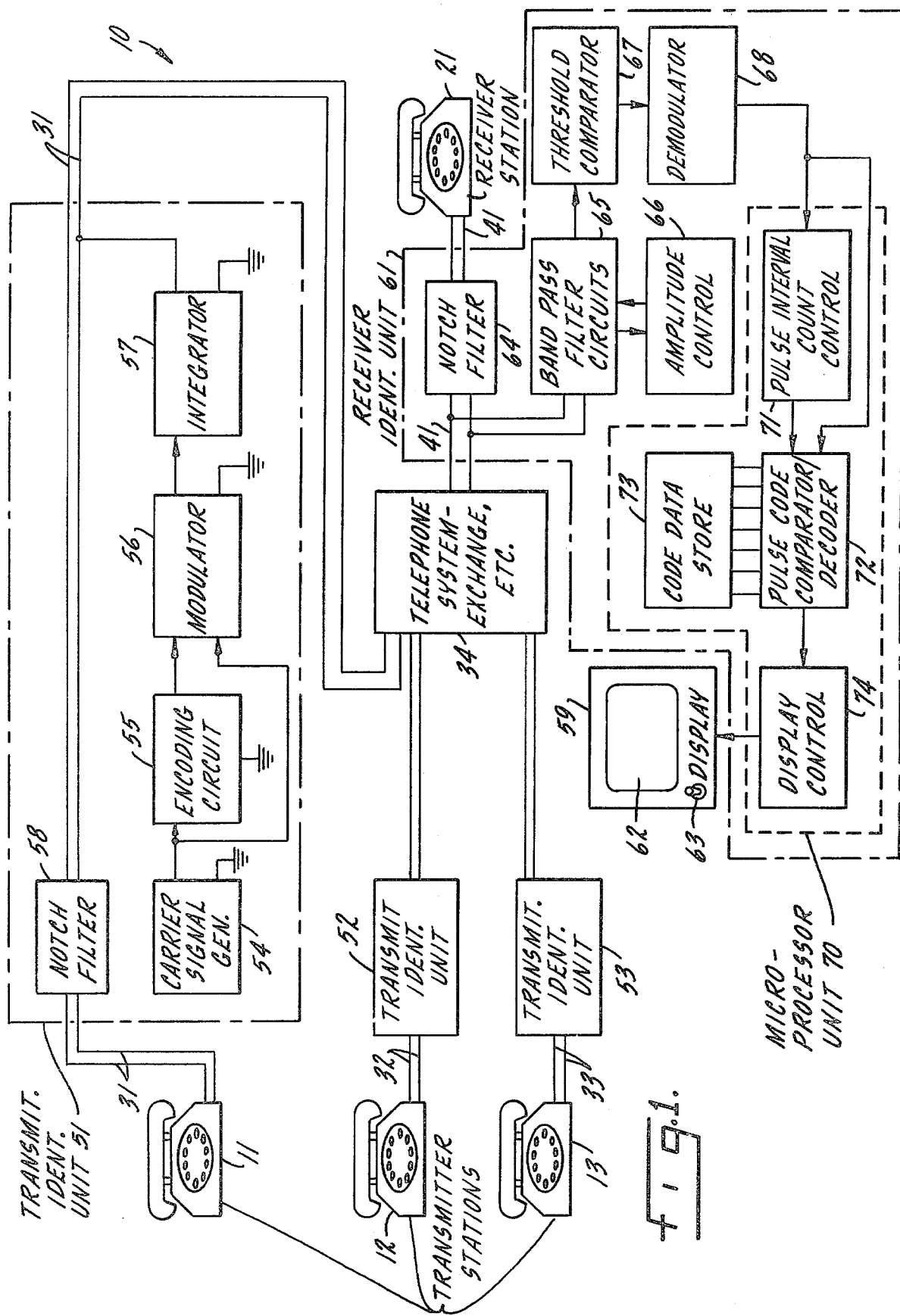

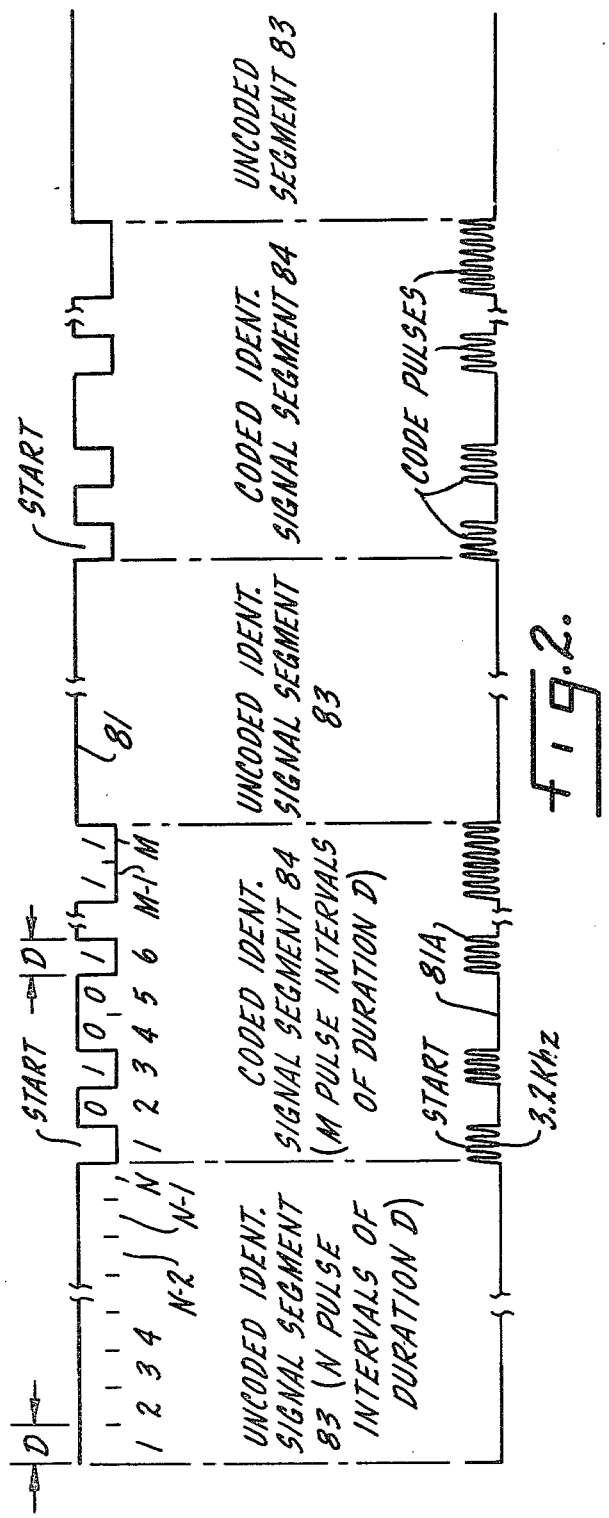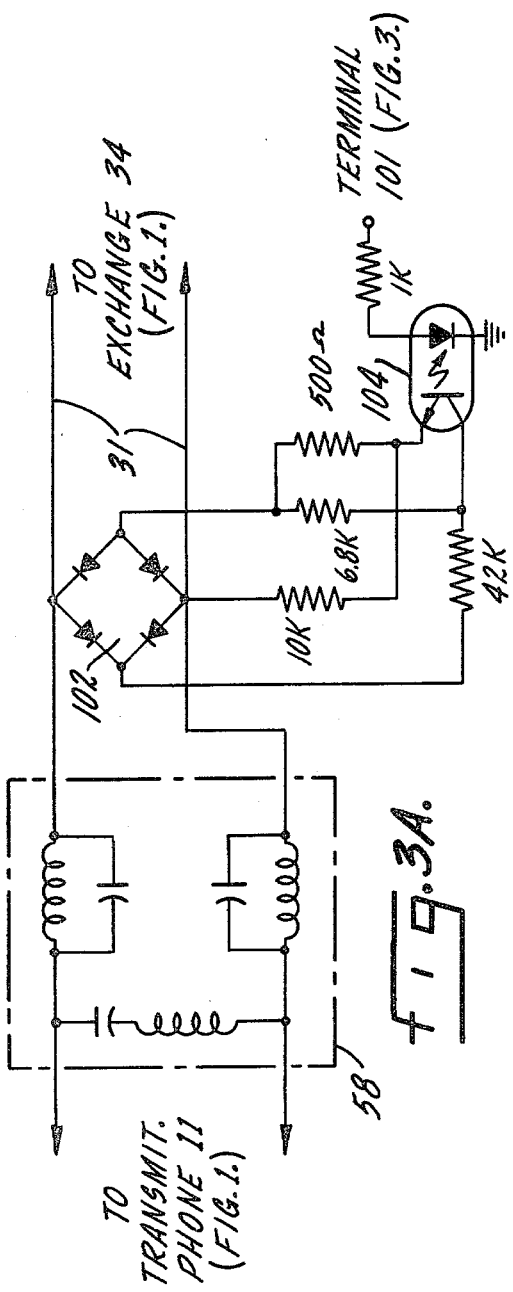

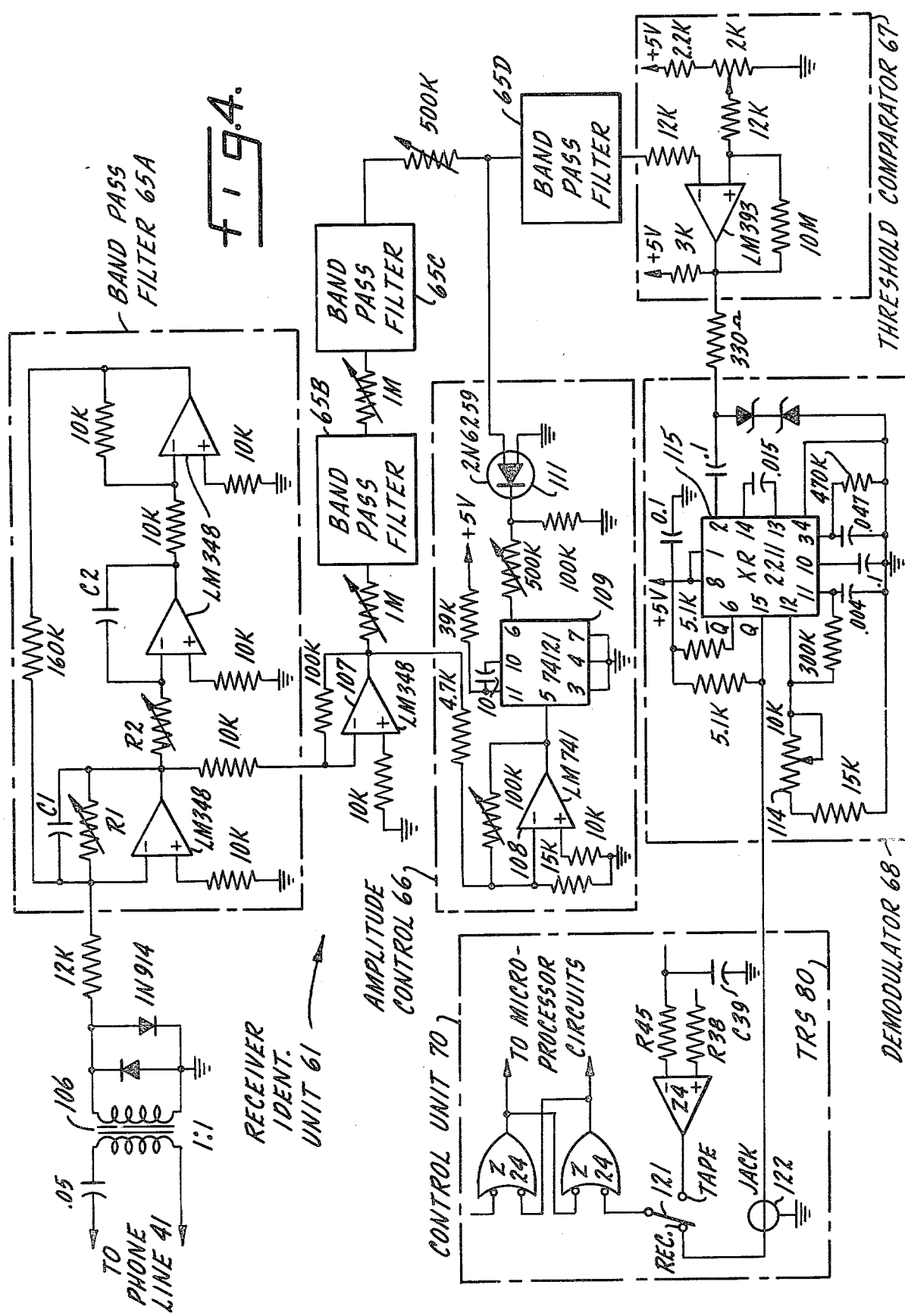

SECURITY IDENTIFICATION SYSTEM USING PULSE CODE MODULATION

BACKGROUND OF THE INVENTION

Many public, semi-public, and private entities are subject to threatening telephone calls of various kinds. Airlines and railroads receive bomb threats by telephone. Governmental offices and private business are subject to similar telephone calls, often relating to the purported placement of bombs in public buildings. A threatening call may be factual; more frequently, the call is a hoax. But the called party cannot determine this with any degree of certainty and is often compelled to evacuate people from a threatened area or take other protective action.

In virtually all instances, attempts to trace such threatening telephone calls are completely ineffective. A time of at least three minutes is usually required to trace a telephone call in virtually any metropolitan area. The caller, whether in a real threat or in a hoax situation, ordinarily hangs up in less than three minutes, so that tracing efforts are quite ineffectual.

Experience indicates that most threatening telephone calls, particularly hoax calls, are made from locations closely adjacent to the threatened facility and usually from public telephones. Thus, a telephone call regarding a bomb is usually made from a pay station located within a radius of one or two miles of the threatened facility. The caller desires to see the activity induced by the call, such as evacuation of an airplane or building and inspection of the threatened facility.

A similar critical communication situation occurs in connection with kidnappings and other forms of extortion. Instructions for meeting the demands of the extortionists are frequently delivered by telephone, again often from a public telephone station. Tracing such calls is usually too time-consuming to be effective.

To cope with this problem, it is highly desirable to provide for effective identification of a substantial number of telephones in the vicinity of any facility likely to receive threatening telephone calls. For example, if an airline has virtually instantaneous-acting means to identify the location of any public telephone station within the airport or within a radius of a few miles of the airport, the source of any threatening call can be located with a reasonable chance that the caller can be apprehended. On the other hand, a security system of this kind capable of identifying the origin of threatening telephone calls cannot be effective if it interferes with normal use of the telephones or gives any readily detectable indication of its presence. Moreover, if a substantial number of telephones must be monitored, it is essential that any equipment added to the transmitting telephones be simple and economical in construction and inconspicuous in size, such that it can be incorporated in the telephone instrument itself without indication of its presence, or be susceptible of installation at an exchange or other location where it cannot be detected. At the receiving station, where threatening calls are to be identified for location of origin, it may also be necessary to add security equipment to a number of telephones, so that the same economic strictures are applicable.

There are other more mundane situations which need verification of the location of origin of a particular communication. For example, a decentralized commercial organization in which it is essential to accommodate business transactions transmitted by telephone line, may require an essentially instantaneous means for determining whether a particular communication originates from a given location. It is common to use specified codes, often changed on a daily basis, for security purposes in a commercial arrangement of this kind. Substantially greater security can be realized, however, if the system has the capability of verifying the origin of messages from all stations in the system.

SUMMARY OF THE INVENTION

It is a principal object of the present invention therefore, to provide a new and improved security identification system, compatible with commercial telephone equipment, that affords positive identification of the location of origin of a communication from any one of a large number of transmitting stations but does not interfere with normal operations of either the identified or identifying stations and does not indicate its presence to the caller.

Another object of the invention is to provide a new and improved telephone security system, capable of identifying any one of a substantial number of transmitting telephone stations at a receiver station, employing identification apparatus that is simple and economical in construction, small enough to be incorporated in any telephone, teleprinter, or like instrument, and sufficiently redundant in operation to assure an extreme high level of reliability.

Accordingly, the invention relates to a security identification system for a telephone transmission system including a plurality of individual transmitter stations at varying locations connectable through the transmission system to a receiver station. The security identification system comprises a plurality of transmitter identification units, each connected to one of the transmitter stations, each transmitter identification unit including identification signal generator means for generating and applying to the transmitter station telephone line a pulse code modulated identification signal unique to the transmitter station to which the identification unit is connected, the identification signal including a repeating sequence of uncoded and coded signal segments, each uncoded signal segment comprising a series of N pulse intervals of fixed duration D, each coded signal segment comprising a series of M pulse intervals of fixed duration D with coding effected by the presence or absence of pulses in those intervals, each code pulse comprising a burst of cycles of a carrier signal of frequency F, with $F>>1/D$. The identification signal generator means comprises a carrier signal generator including a stabilized oscillator, that develops a continuous carrier signal at the carrier frequency F, an encoding circuit that utilizes the carrier signal as a synchronizing signal and that develops a pulse code signal corresponding to the uncoded and coded segments of the identification signal, and a modulator for modulating the carrier signal with the pulse code signal to generate the identification signal. Each transmitter identification unit also includes filter means, interposed in series in the transmitter station telephone line, to preclude transmission of the identification signal to the transmitter station. A visual display and a receiver identification unit are associated with the receiver station; the receiver identification unit comprises demodulator means, coupled to the receiver station telephone line, for demodulating the identification signal to develop a pulse code signal corresponding to the identification signal but with the carrier effectively eliminated, control means for utilizing the pulse code signal to actuate the display to afford a visual representation identifying the particular transmitter station from which that identification signal originates, the control means including means for identifying the beginning of a coded signal segment in the pulse code signal by counting successive pulse intervals in an uncoded signal segment to assure identification of the beginning of a coded signal segment, and filter means, interposed in series in the receiver telephone line, to preclude transmission of the identification signal to the receiver station.

BRIEF DESCRIPTION OF THE DRAWINGS

FIG. 1 is a schematic block diagram of a security identification system constructed in accordance with one embodiment of the invention;

FIG. 2 illustrates the form of the identification signal employed in the security system of FIG. 1;

FIG. 3A is a schematic circuit diagram of a modification of a portion of the transmitter identification unit of FIG. 3; and FIG. 4 is a schematic circuit diagram of one form of receiver identification unit that may be employed in the security system of FIG. 1.

DESCRIPTION OF THE PREFERRED EMBODIMENTS

Figure 3:
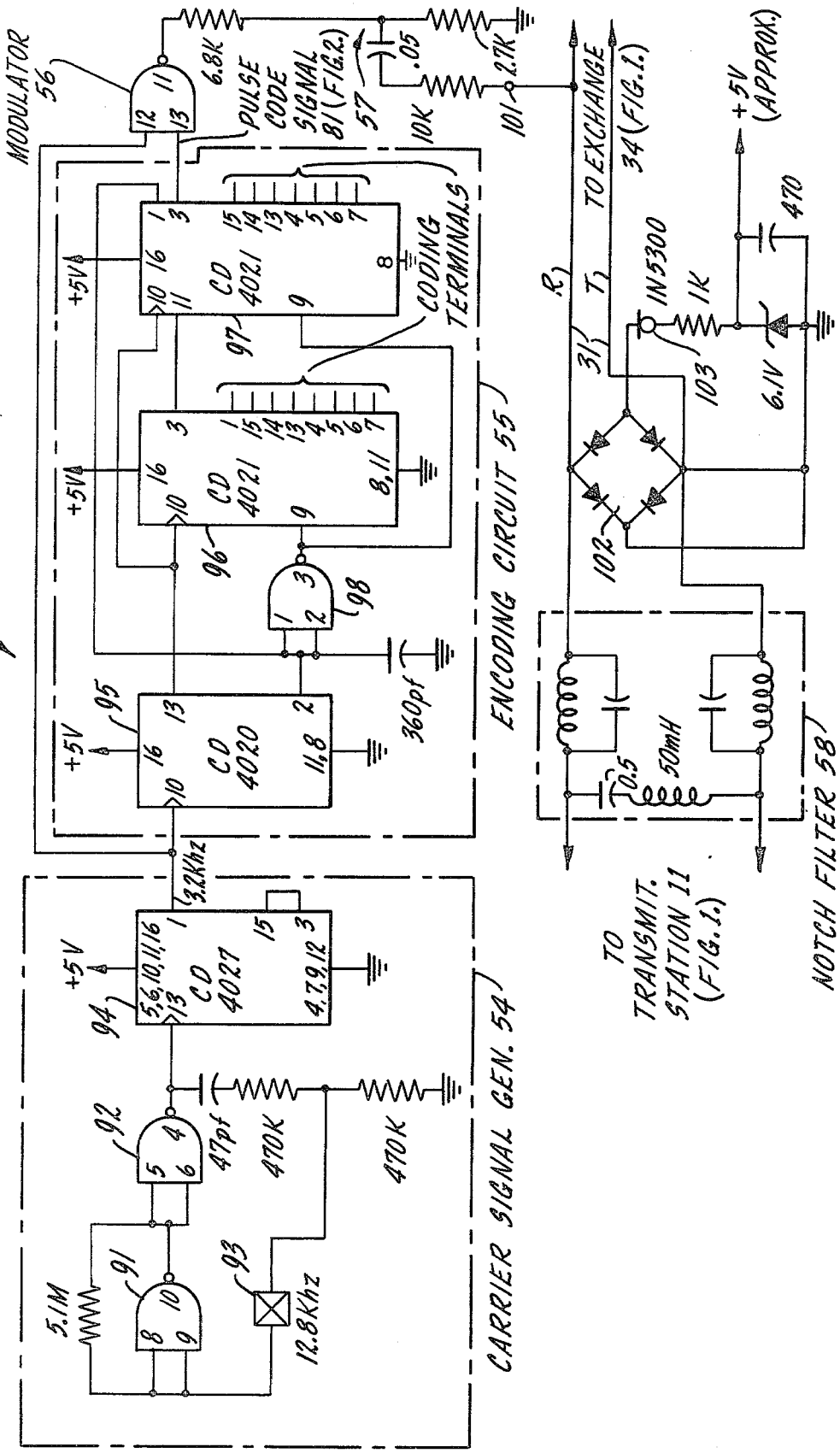
FIG. 3 is a schematic circuit diagram of one form of transmitter identification unit that may be employed in the security system of FIG. 1.

In this specification the terms "station" and "telephone station" are intended to include a telephone, a teleprinter, or any other communication instrument connected to a telephone-type transmission system. References to "transmitter" stations encompass any stations which are to be identified as to location. References to "receiver" stations are intended to include any stations at which identification of the location of an incoming communication is made. It should be understood that a given telephone, teleprinter, or other communication station might, in a given system, constitute both a transmitter station and a receiver station.

FIG. 1 illustrates a security identification system 10 constructed in accordance with one embodiment of the present invention. System 10 includes much apparatus that is a part of a conventional public or private telephone system. Thus, the conventional portion of the system includes a plurality of transmitter telephone stations 11, 12 and 13 and one or more receiver stations such as the telephone 21. For example, the receiver telephone station 21 might be located in the central reservation office of an airline. Typically, in that situation, the transmitter telephone station 11-13 would be individual public telephones located in an airport (or airports) served by the airline or within a radius of a few miles from such an airport. In another situation, the receiver station 21 might be located in the central facilities of a multi-office business organization, such as a bank or brokerage house, with the transmitter stations 11-13 located at branch offices. As noted above, a single station might constitute both a transmitter station and a receiver station in a given security system.

Each transmitter telephone station 11-13 is connectible to any receiver station, such as telephone 21, in system 10. In most instances, the connecting apparatus will constitute the facilities of a public telephone system. Thus, telephone station 11 is connected by a two or three conductor telephone line 31 into a telephone system that may include one or more exchanges, generally represented at 34. The exchange(s) and other transmission facilities of the telephone system 34 are ultimately connectible to the operating line 41 for the receiver station 21. Telephone lines 32 and 33 serve transmitter stations 12 and 13 respectively.

A transmitter identification unit 51 is associated with station 11 and similar transmitter identification units 52 and 53 are associated with telephone stations 12 and 13 respectively. The first transmitter identification unit 51 includes identification signal generator means for generating an identification signal that is unique to station 11. In the illustration construction the identification signal generator means comprises a carrier signal generator 54, basically a stablized oscillator, capable of generating a constant-frequency carrier signal at a relatively high frequency F, above the range of most voice communication frequencies but within the transmission capability of the telephone system to which station 11 is connected. The carrier frequency is preferably above three kilohertz.

The carrier signal output of generator 54 is applied to an encoding circuit 55 and to a modulator 56. The output of encoding circuit 55 is also connected to modulator 56. The output signal from modulator 56, comprising an identification signal described more fully in connection with FIG. 2, is connected to the local telephone line 31 serving station 11, preferably through an integrator 57. A notch filter 58, having a rejection frequency corresponding to the carrier signal frequency F, is interposed in telephone line 31. As noted above, the remaining transmitter identification units 52 and 53 are each of a construction corresponding to that illustrated for unit 51.

At the other end of system 10, receiver station 21 is associated with a visual display device 59 and a receiver identification unit 61. Device 59, as shown, affords a visual display on a cathode ray tube 62. Display 59 may include a manual actuation control such as the on-off switch 63.

The receiver identification unit 61, as shown in FIG. 1, comprises a notch filter 64, tuned to the carrier signal frequency F, interposed in the local telephone line for receiver station 21. A band pass filter circuit unit 65 is connected to the local telephone line 41 ahead of notch filter 64; an amplitude control 66 for the band pass filter circuit is preferably provided. The output of filter means 65 is applied to a threshold comparator 67 which is in turn connected to a carrier demodulator 68.

The output of demodulator 68 is coupled to a control unit 70 preferably constituting a programmed microprocessor or mini-computer. To assist in an understanding of the operation of receiver identification unit 61, the principal functions required of microprocessor unit 70 are shown as individual operating circuits within that unit; it should be understood, however, that the actual physical arrangement of circuits within unit 70 may be very different from that illustrated. As shown, microprocessor unit 70 includes a pulse interval count control 71 to which the output from demodulator 68 is supplied. The output of circuit 68 is also applied to a pulse code comparator and decoder unit 72 that receives an enabling input from pulse interval count control 71. The comparator/decoder 72 is connected to a code data store 73 in which identification data for all of the transmitter stations involved in security system 10 is recorded. The output of circuit 72 is connected to a display control circuit 74 for actuation of display 59.

In considering the operation of system 10, FIG. 1, it may first be assumed that a caller picks up the handset of transmitter telephone station 11 and dials the telephone number for receiver station 21. The call is relayed through the telephone system 34, which may include several exchanges and even a long distance link. Telephone 21 rings, and the operator picks up the handset of the receiver telephone station. At this point, assuming switch 63 is positioned to maintain display 59 inoperative, there is no identification operation performed by security system 10. If the telephone call is of a normal, non-critical nature, the call is completed in the usual manner with no disturbance of any portion of the telephone system.

To understand the security identification operation of system 10, the best starting point is the operation of transmitter identification unit 51. As noted above, carrier signal generator 54 develops a carrier signal at a constant frequency F within the transmission capabilities of telephone system 34 but preferably above 3 Khz. That carrier signal is supplied to modulator 56. It is also applied as a timing or synchronizing signal to encoding circuit 55, which generates a modulation signal corresponding essentially to the pulse code signal 81 illustrated in FIG. 2. The pulse code signal 81 comprises a repeating sequence of uncoded identification signal segments 83 and coded identification signal segments 84. Each uncoded identification signal segment 83 comprises a series of N pulse intervals of fixed duration D. Each coded signal segment 84 includes a series of M pulse intervals of constant duration D with coding effected by the presence or absence of pulses in those intervals. There is a pulse in the first pulse interval in each coded identification signal segment 84, to indicate the start of a coded segment. The uncoded and coded signal segments 83 and 84 follow each other in a continuing sequence, in the pulse code signal 81, as shown in FIG. 2. The code shown in FIG. 2 is 01001 . . . 11, with each negative-going pulse identified as a logical "one".

The pulse code signal from encoding circuit 55 is modulated with the carrier signal, in modulator 56, to produce an output signal that corresponds to the signal 81A illustrated in FIG. 2; as compared with signal 81, each pulse is now inverted in polarity by modulator 56 and each pulse comprises a burst of cycles at the carrier frequency F, typically 3.2 Khz. This pulse code modulated carrier signal 81A is integrated, in the integrator circuit 57, and applied to the telephone line 31 as an identification signal unique to transmitter station 11. The construction and operation of the transmitter identification units 52 and 53 for transmitter stations 12 and 13, respectively are the same except that the code, in the coded identification signal segments 84, is different for each transmitter station. The integration of the pulse code modulated carrier signal, in circuit 57, reduces the harmonic content of the carrier and avoids introduction of excessive noise into the operation of the overall telephone system.

The transmitter identification units 51-53 are very small and compact. Each can be installed, complete, in the housing of an ordinary telephone such as telephone 11. Alternatively, the transmitter identification unit for a given transmitter station can be installed in a junction box to which the transmitter station is connected. Another arrangement, frequently desirable, is to install the transmitter identification unit at the first exchange in system 34 to which the transmitter stations are connected. In all instances, the transmitter identification units afford unique identification for each transmitter station.

For simplicity, it is usually preferably to have the number of pulse intervals N in each uncoded signal segment 83 equal to the number of pulse intervals M in each coded segment 84. The number of pulse intervals in each segment of the identification signal can vary substantially. For example, if M is sixteen, and one pulse in each coded segment 84 is employed to identify the beginning of that segment, security system 10 can handle more than thirty-two thousand transmitter stations. On the other hand, if M is increased to twenty-four, some eight million transmitter stations can be uniquely identified. The pulse repetition frequency 1/D is preferably a sub-multiple of the carrier frequency F; a typical pulse duration D may be eighty milliseconds so that the repetition frequency 1/D is 12.5 hertz, assuming $F=3.2$ Khz.

The pulse modulated carrier constituting the identification signal is not supplied to transmitter station 11; it is effectively eliminated by notch filter 58 at the transmitter station end of the system. Similarly, the notch filter 64 precludes transmission of the bursts of carrier signal to the receiver station 21. In receiver identification unit 61, however, the identification signal is separated from other signals on telephone line 41 and supplied to threshold comparator 67 by the band pass filter circuit 65. This is, any voice signals and noise on line 41 are effectively rejected in band pass filter circuit 65. Threshold comparator 67 also is employed to minimize possible transmission of noise and voice signals to the following circuits in unit 61. Circuit 68 demodulates the identification signal (signal 81A but with some amplitude variations and some vestigial noise) to produce a train of pulse signals, corresponding to original pulse code signal 81 (FIG. 2), which is then supplied to microprocessor unit 70.

Whenever an incoming call is of a threatening or emergency nature, or otherwise requires identification of its origin, the operator at receiver station 21 actuates switch 63 to activate display 59 (FIG. 1). Microprocessor unit 70, counts pulse intervals in the pulse code signal from demodulator 68 until it identifies an uninterrupted sequence of N pulse intervals corresponding to one of the uncoded identification signal segments 83 (FIG. 2). This results in the application of an enabling signal from pulse interval count control 71 to the comparator/decoder 72, which checks for the presence of a start pulse indication signifying the beginning of one of the coded identification signal segments 84. The sequence of code pulse signals in the identification signal segment 84 is then compared to previously recorded information, from the code data store 73, identifying the locations of all of the transmitter stations 11-13. The first comparison match identification is not used to actuate display 59. When a repeated comparison match is identified, however, decoder 72 reads out the transmitter station location to control 74, which actuates display 59 to provide the necessary location data to the operator of receiver station 21. The entire identification operation is completed in a very short time, a matter of only seconds.

In the preferred construction for system 10 that is described hereinafter, each encoding circuit 55 for the transmitter identification units (FIG. 1) comprises one or more shift registers. These shift registers are precoded at the factory. Thus, each transmitter identification unit, as shipped, has its own unique code.

System 10 allows for ready expansion to accommodate additional transmitter stations, if the number of pulse intervals M for the coded identification signal segments 84 (FIG. 2) has been made large enough in the first instance. Essentially, such expansion requires only the connection of additional data storage capacity to microprocessor unit 70 (FIG. 1). Field adjustment is usually unnecessary. The receiver display control unit 70 may comprise virtually any computer system, including those that can be used for other control purposes as well as for location identification. The identification signals are effectively segregated from voice or other data signals transmitted on the telephone lines of the system; the likelihood of error in location identification is quite remote, particularly due to the redundant character of the identification process in the receiver identification unit 61 and the nature of the pulse code modulated identification signal itself. The uncoded identification signal segments 83 are of substantial importance in assuring system integrity and accuracy; they provide for positive identification of the beginning of each coded signal segment 84, over and above any start code, and effectively preclude error that might otherwise occur, as when a call starts in the middle of one of the identification signal segments. Only a single carrier frequency is used, reducing the possibility of detection of the presence of the security system or other interference with normal operation of the overall communication system, as compared with plural-tone identification arrangements. As noted above, integrator 57 reduces the harmonic content of the pulse modulated carrier and thereby further reduces the possibility of detection of the presence of the security apparatus.

FIG. 3 is a detailed circuit diagram of one specific construction that may be used for the transmitter identification unit 51 and other like units in system 10 (FIG. 1). In FIG. 3, and also in FIG. 4 described below, most circuit parameters are set forth directly in the drawing. Capacitor values are in microfarads unless otherwise indicated.

Carrier signal generator 54, in the circuit of FIG. 3, comprises a stabilized oscillator including two NAND gates 91 and 92 connected in a conventional configuration to a crystal, a tuning fork resonator, or other stabilizing element 93. In this instance, the operating frequency for the stabilization element 93 is 12.8 Khz. The output of the oscillator is supplied to a dual J-K flip-flop 94 connected to function as a frequency divider having a division factor of four, so that the carrier signal output from generator 54 is at 3.2 Khz.

The initial stage of encoding circuit 55, in the arrangement illustrated in FIG. 3, is a binary counter 95 functioning as a frequency divider. Counter 95 develops a pulse signal output having a frequency of 12.5 hertz (3.2 Khz÷256), the required frequency for a pulse duration interval D of 80 milliseconds. It also develops a reset signal at a frequency of 3.2 Khz÷(256×32), for a total sequence of M+N=32, assuming M=N=16 so that there are sixteen pulse intervals in each segment 83 and 84 of the identification signal. There is one output connection, for the 12.5 hertz pulse signal, from the frequency divider 95 direct to one input of each of two eight-stage shift registers 96 and 97. A second output connection from frequency divider 95 supplies the reset signal to each of the shift registers 96 and 97, this second connection being afforded through a NAND gate 98. Register 96 has eight coding terminals and register 97 has seven coding terminals that are used to determine the unique code for the identification unit. This is accomplished by selective connection of the coding terminals of the two shift registers to the +5 volt supply or to ground. The output from register 97 is the pulse code signal 81 (see FIG. 2).

In FIG. 3, modulator 56 comprises a simple NAND gate having one input derived directly from the output of carrier signal generator 54 and the other from shift register 97. The NAND gate of modulator 56 and the other NAND gates 91, 92, and 98 may all be a part of a quad unit type CD4011. A simple R-C network provides the integrator 57, connected by an output terminal 101 to one of the conductors 31R and 31T, in this instance the conductor 31R, of telephone line 31.

The specific transmitter identification unit 51 shown in FIG. 3 derives its approximately five volt power supply from telephone line 31. This is accomplished by a bridge circuit 102 connected to the two lines 31R and 31T, with one of the bridge terminals connected to a constant current device 103 that is returned to the other bridge terminal (grounded) through a resistor and the parallel combination of a zener diode and a capacitor. Notch filter 58, as shown in FIG. 3, may comprise a choke coil and parallel capacitor in series in each of the two telephone lines, with a series resonant combination of a choke coil and a capacitor connected across the two lines. A more sophisticated form of notch filter may be utilized if desired. The diodes in bridge 102 may be Type AB40 or Type VM48.

FIG. 3A illustrates a modification of the circuit of FIG. 3 for use in situations where a local power supply is available and it is not necessary to derive the transmitter identification unit power from the telephone line. Thus, the modification of FIG. 3A may be employed, and is preferred, in those instances in which the transmitter identification units are installed at an exchange. In this arrangement, the output terminal 101 from integrator 57 (FIG. 3) is connected to the bridge 102 through an opto-isolator 104. The bridge provides the requisite connection to the telephone line 31. This isolated connection is preferred because it further reduces even the minimal addition of noise to the telephone system that may occur with the circuit arrangement of FIG. 3.

FIG. 4 provides a detailed circuit diagram of a receiver identification unit 61 suitable for the system illustrated in FIG. 1. The illustrated circuit starts with a 1:1 coupling transformer 106 connected to a first band pass filter 65A through a coupling circuit that includes two diodes, provided for voltage limiting purposes. Filter 65A comprises three operational amplifiers connected in a configuration that is repeated in three additional band pass filters 65B, 65C, and 65D. The additional filters 65B–65D include the same circuit elements as shown for filter 65A, with some variations in the parameters for capacitors C1 and C2 and resistors R1 and R2. Appropriate circuit values are set forth in Table I.

TABLE I

| Filter | C1 | C2 | R1 | R2 |
|--------|------|------|-------|-----|
| 65A | .001 | .001 | 1 meg | 20K |
| 65B | .01 | .01 | 1 meg | 2K |
| 65C | .1 | .001 | 100K | 2K |
| 65D | .1 | .001 | 100K | 2K |

The circuit connection from filter 65A to filter 65D (the filters are arranged in series) includes an additional operational amplifier 107 connected in a relatively high gain circuit.

The amplitude control circuit 66, in the construction illustrated in FIG. 4, comprises an operational amplifier 108 connected to a one-shot trigger circuit 109 that is in turn connected to the coupling circuit between filters 65C and 65D by a field-effect transistor 111. Control 66 functions much in the manner of an automatic gain control, maintaining relatively high signal levels through the band pass filters, particularly stage 65D, whenever carrier frequency signals are being supplied to identification unit 61. When there are no carrier signals present, control 66 effectively reduces the input level to the final band pass filter 65D to afford increased immunity to false actuation by noise on the telephone line.

Threshold comparator 67, in the circuit arrangement of FIG. 4, is relatively conventional, providing a comparison with a fixed threshold voltage determined by adjustment of a potentiometer 112.

The demodulator 68 illustrated in FIG. 4 constitutes a rather unusual adaptation of a Type XR2211 single-frequency tone detector 115 of the phase lock loop type. In the illustrated circuit, tone detector 115 is tuned to the carrier frequency, in this instance 3.2 Khz. This adjustment is effected by means of the potentiometer 114. The input to demodulator 68 is the identification signal, in the form of a series of bursts at the carrier frequency as illustrated by waveform 81A in FIG. 2; the output is a relatively sharply defined pulse code signal corresponding to the original modulating signal 81. It is this pulse code signal, with the carrier frequency eliminated, that is supplied to the microprocessor control unit 70.

In the control unit 70, the microprocessor samples the input signal a number of times for each pulse interval and evaluates for a logical "one" or "zero" on a majority basis. Typically, for an eighty millisecond pulse interval, a sampling rate of eleven times per pulse interval may be used.

FIG. 4 also illustrates a simple and inexpensive adaptation of a commercially available minicomputer, the Radio Shack model TRS 80, that can be utilized as the receiver identification control, unit 70, in identification unit 61. The "tape" input to the central processing unit of the computer is modified to incorporate a single-pole double-throw switch 121 having "tape" and "receive" positions. The "receive" position for switch 121 is connected to the output of demodulator 68 by suitable means such as a jack 122. The added switch 121 and jack 122 are the only modifications needed for the TRS 80. A suitable operating program for the computer is as follows:

```
10 'MICROTEK ROUTINE'
11 GOTO 15
12 SAVE"MICROTEK" END
15 CLEAR 5000 GOSUB 50000
19 GOSUB 40000 CLS
20 GOSUB 45050: PRINT R$,
30 IF R$=TP$ GOSUB6000 ELSE IF R$=PS$ GOSUB 5000 ELSE IF R$=LT$ GOSUB 5500 ELSE IF R$=A$ GOSUB 1000
   R$=E$ GOSUB 3000 ELSE IF R$=S$ END
40 GOTO 20
1000 'ADD ROUTINE'
1001 M$=A1$: GOSUB 45200 IF R=0 GOSUB 64790: RETURN
1005 IF R>MX% EM$=E3$: GOSUB 45400 GOTO 1000
1006 LR%=R: GOSUB 64810: IF MID$(LR$,13,1)<>CHR$(0) EM$=E1$: GOSUB 45400 GOTO 1000
1010 MD$(1)=STR$(R): MD$(2)=STRING$(50,CHR$(160)): MD$(3)=MD$(2): MD$(4)=" "
1020 GOSUB 45300 F=2
1030 GOSUB 65000. IF R%=27 THEN GOSUB 64790: RETURN
1035 ER%=0: GOSUB 64400 IF ER%>0 F=ER%: PRINT@ BL%, CHR$(30): GOTO 1030
1040 GOSUB 64750: GOSUB 64820
1999 GOTO 1000
2000 'CHANGE ROUTINE'
2002 M$=C1$. GOSUB 45200 IF R=0 GOSUB 64790: RETURN
2005 IF R>MX% EM$=E3$ GOSUB 45400 GOTO 2000
2007 LR%=R GOSUB 64810 IF MID$(LR$,13,1)=CHR$(0) EM$=E2$ GOSUB 45400 GOTO 2000
2010 GOSUB 64300 MD$(1)=STR$(R) MD$(2)=NA$ MD$(3)=AD$ MD$(4)=PH$ GOSUB 45300 F=2
2020 GOSUB 65000 IF R%=27 THEN GOSUB 64790: RETURN
2035 ER%=0: GOSUB 64400 IF ER%>0 F=ER% PRINT@ BL%, CHR$(30), GOTO 2030
2040 GOSUB 64750 GOSUB 64820
2999 GOTO 2000
3000 'DELETE ROUTINE
3002 M$=D3$. GOSUB 45200 IF R=0 GOSUB 64790: RETURN
3005 IF R>MX% EM$=E2$ GOSUB 45400 GOTO 3000
3007 LR%=R GOSUB 64810 IF MID$(LR$,13,1)=CHR$(0) EM$=E2$ GOSUB 45400 GOTO 3000
3010 GOSUB 64300 MD$(1)=STR$(R) MD$(2)=NA$ MD$(3)=AD$ MD$(4)= PH$ GOSUB 45300
3020 PRINT@ BL%, D1$, INPUT R$ IF R$<>D2$ GOSUB 64790 RETURN
3030 MID$(LR$,1,RL%)=STRING$(RL%,CHR$(0)) GOSUB 64820
3999 GOTO 3000
5000 'PRINT SCREEN ROUTINE'
5010 DEFUSR1=&H8FD0 ::=USR1(0). RETURN
5500 'LIST TABLE ENTRIES'
5502 ES%=0 PT%=LE%
5505 CLS B%=0 IF TC%(PT%)=0 THEN ES%=1: GOTO 5532
5510 IF TC%(PT%)=0 THEN GOTO 5520
5512 LR%=TC%(PT%) GOSUB 64810 GOSUB 64290: GOSUB 64320 IF MID$(LR$,13,1)=CHR$(0) NA$=E5$
5515 DF$(3)=STR$(TC%(PT%)): DF$(4)=TC$(PT%): DF$(5)=PH$: DF$(1)=NA$. DF$(2)=AD$ GOSUB 45060: GOSU
5520 IF PT%=LE%+1 OR (PT%=1 AND LE%=TL%) OR TC%(PT%)=0 THEN ES%=1 GOTO 5530
5522 IF PT%=1 PT%=TL% ELSE PT%=PT%-1
5524 IF B%<>768 B%=B%+256 GOTO 5510
5530 EM$=L1$: GOSUB 45400: R%=ASC(R$): IF R$=PS$ GOSUB 5000 GOTO 5530
5532 IF R%<>13 OR ES%=1 THEN CLS B%=0: RETURN
5599 GOTO 5505
6000 'TELEPHONE SCAN ROUTINE'
6005 PRINT@ BL%, T1$, CHR$(30): GOSUB 8000 IF R=0 RETURN
6010 IF R>MX% NA$=E5$ AD$="" PH$="" GOTO 6020
```

```
6015 LR%=R: GOSUB 64810: GOSUB 64290: GOSUB 64320: IF MID$(LR$,13,1)=CHR$(0) NA$=E5$
6020 DF$(3)=STR$(R): DF$(4)=TIME$: DF$(5)=PH$: DF$(1)=NA$: DF$(2)=AD$
6030 LE%=LE%+1: IF LE%>TL% LE%=1
6040 TC%(LE%)=R: TC$(LE%)=DF$(4)
6045 GOSUB 45060: GOSUB 45100: IF B%<>768 B%=B%+256 ELSE B%=0
6099 RETURN
7000 I=0: N$=STRING$(10,CHR$(0))
7010 R$=INKEY$: IF R$="" GOTO 7010 ELSE R%=ASC(R$)
7020 IF R%=13 THEN R=VAL(LEFT$(N$,I)): RETURN
7030 IF R%<48 OR R%>57 THEN GOTO 7010
7040 PRINT R$;: I=I+1: MID$(N$,I)=R$: GOTO 7010
8000 R=USR2(0):RETURN
20000 CLOSE: KILL"MASTER": OPEN "R", 1, "MASTER": LV$=STRING$(255,CHR$(0))
20010 FOR J=1 TO 25: FIELD 1, 255 AS PR$: LSET PR$=LV$: PUT 1,J: NEXT: CLOSE: RETURN
30000 CLEAR 2000: GOSUB 50000: GOSUB 40000
30010 FOR J=1 TO 75: LR%=J: GOSUB 64810: IF MID$(LR$,13,1)=CHR$(0) GOTO 30100
30020 GOSUB 64300: LPRINT "    ": LPRINT DC$(3);"   ";J: LPRINT DC$(1)."   ",NA$: LPRINT DC$;
;PH$
30100 NEXT: CLOSE: END
40000 LG%=INT(PL%/RL%): DD%=ND%-1: LD%=LG%*NP%: M%%=LD%*DD%: MX%=75: LE%=0: B%=0
40050 CLS: PRINT@ 0, M3$: PRINT@ 64, TI$: PRINT@ (64+LEN(TI$)+1), TIME$: GOSUB 65500: R%=ASC(R$)
40100 J=0: GOSUB 64900: IF FD$="X" PRINT@ BL%, E4$, J; : CLOSE: END
40110 CLOSE
40115 DEFUSR2=&HBF00
40120 FOR J=1 TO DD%: GOSUB 64800: NEXT
40125 DC$(4)="     "
40130 FOR J=1 TO 5: DF%(J)=DC%(J)+LEN(DC$(J))+1: NEXT
40140 FOR J=1 TO 4: MD%(J)=MC%(J)+LEN(MC$(J))+1: NEXT
40200 RETURN
45050 PRINT@ BL%, CHR$(30),: PRINT@ M1%, M1$,: GOSUB 65500: RETURN
45060 FOR J=1 TO 3: PRINT@ (B%+(J-1)*64), CHR$(30): NEXT: RETURN
45100 FOR J=1 TO 5: PRINT@ (DC%(J)+B%), DC$(J): PRINT@ (DF%(J)+B%), DF$(J): NEXT: RETURN
45200 R=0: CLS: PRINT@ 0, M$: PRINT@ 64, M2$: INPUT R: RETURN
45300 CLS: FOR J=1 TO 4: PRINT@ MC%(J), MC$(J): PRINT@ MD%(J), MD$(J): NEXT: RETURN
45400 PRINT@ BL%, EM$, CHR$(30);: GOSUB 65500: RETURN
50000 'SEPARATE SET-UP MODULE'
50010 GOTO 50015
50012 SAVE"MICROCON"
50015 TP$="T": PS$="P": LT$="L": A$="A": C$="C": E$="D": S$="S": ND%=2: NP%=335: PL%=255: RL%=85: 
50020 DIM DC$(5), DC%(5), DF$(5), DF%(5), MC$(4), MC%(4), MD$(4), MD%(4), TC%(TL%), TC$(TL%)
50170 DC$(3)="CODE:": DC$(5)="PHONE:   ": DC$(1)="NAME:    ": DC$(2)="ADDRESS:": DC%(1)=0: DC%(2)=64
 68
50190 MC$(1)=DC$(3): MC$(2)=DC$(1): MC$(3)=DC$(2): MC$(4)=DC$(5): MC%(1)=256: MC%(2)=320: MC%(3)=3
50310 M1$="ENTER COMMAND ": M1%=1000
50320 M2$="ENTER CODE NUMBER "
50330 M3$="VERIFY DATE AND TIME - PRESS ENTER TO CONTINUE"
50340 BL%=960   'BOTTOM LINE OF SCREEN'
50350 E1$="ENTRY ALREADY EXISTS"
50360 E2$="ENTRY NOT FOUND"
50370 E3$="INVALID TELEPHONE CODE"
50380 E4$="DATA DISKETTE NOT ON DRIVE # "
50390 E5$="**** CODE NOT ON FILE ****"
50400 E6$="NAME/ADDRESS FIELDS TOO LONG"
50410 D1$="ENTER--DELETE--TO DELETE THIS RECORD "
50420 D2$="DELETE"    'DELETE SIGNAM'
50421 D3$="DELETE ROUTINE": A1$="ADD ROUTINE": C1$="CHANGE ROUTINE"
50425 T1$="NOW POLLING TELEPHONE LINE ? "
50432 TI$="DATE/TIME": L1$="PRINT OR CONTINUE"
50500 RETURN
64290 NA$=STRING$(50,CHR$(0)): AD$=NA$: PH$="            ": RETURN
64300 NA$=STRING$(50,CHR$(160)): AD$=NA$: PH$="          ": 
64320 PH$=MID$(LR$,1,12): I=13: L=ASC(MID$(LR$,I)): MID$(NA$,1)=MID$(LR$,I+1,L): I=I+L+1: L=ASC(MID
+1,L): RETURN
64400 TR$=STRING$(255," "): MID$(TR$,1)=MD$(4): J=2: LC=13
64402 T$=MD$(J): GOSUB 64440: MID$(TR$,LC)=CHR$(L%)+LEFT$(T$,L%): LC=LC+L%+1: IF J<3 J=J+1: GOTO  
64410 LB=LC-1: IF LC>RL% EM$=E6$: GOSUB 45400: ER%=2
64415 L=LC: RETURN
64440 T%=INSTR(T$+CHR$(160),CHR$(160))-1: IF T%=0 THEN L%=0: RETURN
64450 FOR L%=T% TO 1 STEP-1: IF MID$(T$,M%,1)<>" " THEN RETURN
64455 NEXT: L%=0: RETURN
64750 MID$(LR$,1,RL%)=STRING$(RL%,CHR$(0)): MID$(LR$,1)=MID$(TR$,1,L): RETURN
64790 CLOSE: B%=0: CLS
64800 OPEN "R", 1, FI$: LV%=0: LP%=1: RETURN
64810 GOSUB 64890: IF DV%=LV% AND PR%=LP% THEN 64815
64814 GET DV%, PR%: LP%=PR%: LV%=DV%
64815 LR$=SR$: RETURN
64820 LSET SR$=LR$: PUT DV%, PR%: RETURN
64890 DV%=1: LR%=LR%-(DV%-1)*LD%
64894 PR%=INT((LR%-1)/LG%)+1: SR%=LR%-LG%*(PR%-1): FIELD 1, (SR%-1)*RL% AS DUMMY$, RL% AS SR$: RETU
64900 ONERRORGOTO 64905: FD$=FI$: OPEN "I", 1, FI$: GOTO 64910
64905 FD$="X": RESUME 64910
64910 ONERRORGOTO 0: RETURN
65000 'THIS IS SCREEN HANDLER ROUTINE
65010 P=1:X=MD%(F):L=LEN(MD$(F)):D$=MD$(F):PRINT@X, "";
65020 GOSUB65500:R%=ASC(R$)
65030 IF R%<32ORR%=91ORR%=112 GOTO65040
65035 IF P>L GOTO65020 ELSE MID$(D$,P)=R$:PRINTR$,:P=P+1:GOTO65020
65040 IF R%=10 GOTO65050 ELSE IF R%=13 GOTO65060 ELSE IF R%=9 GOTO65070 ELSE IF R%=8 GOTO65080 ELS
  GOTO65100 ELSE IF R%=31 GOTO65110 ELSE IF R%=112 GOTO65120 ELSE GOTO65020
```

```
65050 MD$(F)=D$ F=F+1 IF F>4 THEN F=1
65055 GOTO65010
65060 MD$(F)=D$ RETURN
65070 IF P<=1 THEN P=P+1 PRINTCHR$(25);
65075 GOTO65020
65080 IF P>1 THEN P=P-1 PRINTCHR$(24);
65085 GOTO65020
65090 MD$(F)=D$ F=F-1 IF F=0 THEN F=4
65095 GOTO65010
65100 GOTO65060
65110 IF P<=L THEN R$=STRING$(L-P+1," "):PRINTR$; MID$(D$,P)=R$,PRINT@X+P-1,"";
65115 GOTO65020
65120 DEFUSR1=&HBFD0 X=USR1(0) GOTO65020
65500 OF=14 'THIS IS BLINKING CURSOR WAIT RTN
65505 R$=INKEY$ IFR$="" GOTO65510 ELSE PRINTCHR$)15); RETURN
65510 OF=OF+1 IF OF=15 PRINTCHR$(14); ELSE IF OF>30 PRINTCHR$(15); OF=1
65515 GOTO65505
```

It will be recognized that system 10 (FIG. 1) may include more than one receiver station, equipped with a receiver identification unit like unit 61. In any such receiver station, it is not essential that a cathode ray tube display be employed. Other forms of display apparatus, including visual displays incorporating light-emitting diodes or the like or even printers may be utilized. Furthermore, although a serial input to the microprocessor unit 70 is assumed in the foregoing description, the identification unit 61 may incorporate appropriate serial to parallel conversion circuits in those instances in which the microprocessor unit requires a parallel input.

For greater sophistication and an even higher level of security, the identification signal transmission can be scrambled, using conventional techniques. If this is done, the de-scrambling operation should be performed at the output of demodulator 68. It will also be recognized that the polarity of the pulse code signal 81, FIG. 2, can be reversed, affording a continuous tone at the frequency F during each uncoded signal segment 83, with start pulse intervals for the coded segments 84 then being preferably devoid of the carrier.

I claim:

1. A security identification system for a telephone transmission system including a plurality of individual transmitter stations at varying locations connectable through the transmission system to a receiver station, the security identification system comprising:
   a plurality of transmitter identification units, each connected to one of the transmitter stations, each transmitter identification unit including:
   identification signal generator means for generating and applying to the transmitter station telephone line a pulse code modulated identification signal unique to the transmitter station to which the identification unit is connected, the identification signal including a repeating sequence of uncoded and coded signal segments, each uncoded signal segment comprising a series of N pulse intervals of fixed duration D, each coded signal segment comprising a series of M pulse intervals of fixed duration D with coding effected by the presence or absence of pulses in those intervals, each code pulse comprising a burst of cycles of a carrier signal of frequency F, with $F >> 1/D$,
   the identification signal generator means comprising a carrier signal generator, including a stabilized oscillator, for developing a continuous carrier signal at the carrier frequency F, an encoding circuit, utilizing the carrier signal as a synchronizing signal, for developing a pulse code signal corresponding to the uncoded and coded segments of the identification signal, and a modulator for modulating the carrier signal with the pulse code signal to generate the identification signal,
   and filter means, interposed in series in the transmitter station telephone line, to preclude transmission of the identification signal to the transmitter station;
   a visual display associated with the receiver station;
   and a receiver identification unit, associated with the receiver station, comprising:
   demodulator means, coupled to the receiver station telephone line, for demodulating the identification signal to develop a pulse code signal corresponding to the identification signal but with the carrier effectively eliminated,
   control means for utilizing the pulse code signal to actuate the display to afford a visual representation identifying the particular transmitter station from which that identification signal originates, the control means including means for identifying the beginning of a coded signal segment in the pulse code signal by counting successive pulse intervals in an uncoded signal segment to assure identification of the beginning of a coded signal segment,
   and filter means, interposed in series in the receiver telephone line, to preclude transmission of the identification signal to the receiver station.

2. A security identification system according to claim 1 in which the control means in the receiver identification unit includes means for verifying at least one repetition of the coded signal segment without change as a precondition to actuation of the display.

3. A security identification system according to claim 1 or claim 2 in which the carrier frequency F is at least about 3 Khz.

4. A security identification system according to claim 3 in which the filter means in the transmitter identification unit is a notch filter tuned to the carrier frequency F.

5. A security identification system according to claim 1 or claim 2 in which the identification signal generator means further comprises an integrator circuit interposed between the modulator and the transmitter station telephone line.

6. A security identification system according to claim 1 or claim 2 in which the encoding circuit comprises:
   a frequency divider, actuated by the carrier signal, for developing a pulse signal having a repetition frequency 1/D at a sub-multiple of the carrier frequency F;
   and at least one coded shift register, actuated by the pulse signal, for developing the pulse code signal, with N=M.

7. A transmitter identification unit for connection to the telephone line of an individual transmitter station in a telephone transmission system, as a part of a security identification system for the telephone transmission system, comprising:
   a carrier signal generator, including a stabilized oscillator, for developing a carrier signal at a frequency F;

an encoding circuit, utilizing the carrier signal as a synchronizing signal, for developing a pulse code signal including a repeating sequence of uncoded and coded signal segments, each uncoded signal segment comprising a series of N pulse intervals of fixed duration D, each coded signal segment comprising a series of M pulse intervals of fixed duration D, with coding effected by the presence or absence of pulses in those intervals, with $F \gg 1/D$, a modulator for modulating the carrier signal with the pulse code signal to generate an identification signal corresponding to the pulse code signal but with each code pulse comprising a burst of cycles of the carrier signal;

coupling means for applying the identification signal to the telephone line of a transmitter station;

and filter means for interposition in the telephone line to preclude transmission of the identification signal to the transmitter station.

8. A transmitter identification unit for a telephone security identification system according to claim 7, in which the encoding circuit comprises:

a frequency divider, actuated by the carrier signal, for developing a pulse signal having a repetition frequency 1/D at a sub-multiple of the carrier frequency F;

and at least one coded shift register, actuated by the pulse signal, for developing the pulse code signal, with N=M.

9. A transmitter identification unit for a telephone security identification system according to claim 7 or claim 8 in which the coupling means comprises an integrator circuit.

10. A transmitter identification unit for a telephone security identification system according to claim 7 or claim 8 in which the carrier frequency F is at least about 3 Khz.

* * * * *